(12) United States Patent
Abe

(10) Patent No.: US 9,503,290 B2
(45) Date of Patent: Nov. 22, 2016

(54) DIVERSITY RECEPTION DEVICE, DIVERSITY RECEPTION METHOD, RECEPTION PROGRAM, AND RECORDING MEDIUM

(71) Applicant: PIONEER CORPORATION, Kanagawa (JP)

(72) Inventor: Yoshinori Abe, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/892,861

(22) PCT Filed: May 21, 2013

(86) PCT No.: PCT/JP2013/064035
§ 371 (c)(1),
(2) Date: Nov. 20, 2015

(87) PCT Pub. No.: WO2014/188508
PCT Pub. Date: Nov. 27, 2014

(65) Prior Publication Data
US 2016/0119167 A1    Apr. 28, 2016

(51) Int. Cl.
*H04B 7/02* (2006.01)
*H04L 25/03* (2006.01)
(Continued)

(52) U.S. Cl.
CPC .............. *H04L 25/03* (2013.01); *H04B 7/08* (2013.01); *H04B 7/0851* (2013.01); *H04L 25/0202* (2013.01); *H04L 27/38* (2013.01); *H04B 7/02* (2013.01)

(58) Field of Classification Search
CPC ............. H04L 1/02; H04B 7/02; H04B 7/08
See application file for complete search history.

(56) References Cited

U.S. PATENT DOCUMENTS 5,202,903 A * 4/1993 Okanoue .............. H04B 7/0845
375/341
5,319,677 A * 6/1994 Kim .................... H04B 7/0845
375/341
(Continued)

FOREIGN PATENT DOCUMENTS

JP    2005-278111    10/2005
JP    2009-253844    10/2009
(Continued)

OTHER PUBLICATIONS

International Search Report, PCT/JP2013/064035, Jul. 9, 2013.
(Continued)

*Primary Examiner* — Jean B Corrielus
(74) *Attorney, Agent, or Firm* — Young & Thompson

(57) ABSTRACT

A CFR estimation unit estimates channel frequency characteristic on the basis of a complex baseband signal provided by a front end via a data distribution unit, and a transmission symbol estimated value provided by a trellis decoder. On the basis of the channel frequency characteristics estimated in this manner, a carrier frequency control unit performs a carrier recovery control in order to become the carrier frequency error to zero in the front end, by performing an Auto Frequency Control based on changes in the channel phase in the full band of the frequency. As a result, carrier synchronization is performed appropriate for mobile receiving, and receiving performance is improved, even in the case of a digitally modulated signal having a DC pilot component by a single carrier.

10 Claims, 6 Drawing Sheets

(51) Int. Cl.
*H04L 27/38* (2006.01)
*H04B 7/08* (2006.01)
*H04L 25/02* (2006.01)

(56) References Cited

U.S. PATENT DOCUMENTS

| | | | |
|---|---|---|---|
| 5,859,870 A * | 1/1999 | Tsujimoto | H04B 7/0671 370/441 |
| 7,567,634 B1 * | 7/2009 | Lou | H03M 13/4107 375/341 |
| 8,045,610 B2 | 10/2011 | Wang | |
| 2009/0252237 A1 * | 10/2009 | Ma | H04L 25/0328 375/260 |
| 2010/0183097 A1 | 7/2010 | Soga et al. | |
| 2011/0004806 A1 | 1/2011 | Adachi | |
| 2013/0177064 A1 * | 7/2013 | Ido | H03M 13/41 375/232 |

FOREIGN PATENT DOCUMENTS

| | | |
|---|---|---|
| JP | 2011-015290 | 1/2011 |
| WO | WO 2007/148452 | 12/2007 |

OTHER PUBLICATIONS

Written Opinion, PCT/JP2013/064035, Jul. 9, 2013.
Advanced Television Systems Committee, "DTV 1-11 Signal Reception and Processing Considerations", ATSC Technology Group Report, Doc. T3-600r4, Sep. 18, 2003, p. 11.

* cited by examiner

DIVERSITY RECEPTION DEVICE, DIVERSITY RECEPTION METHOD, RECEPTION PROGRAM, AND RECORDING MEDIUM

TECHNICAL FIELD

The present invention relates to a diversity reception device that receives and demodulates a signal digitally modulated according to a single carrier modulation format, to a diversity reception method, to a reception program, and to a recording medium upon which such a reception program is recorded.

BACKGROUND ART

In recent years, terrestrial digital broadcasting has spread worldwide. While there are a plurality of standards relating to terrestrial digital broadcasting, the ATSC (Advanced Television System Committee) standard is employed in the USA, Canada, Mexico, and South Korea. As modulation format, the ATSC standard employs 8VSB modulation (8-ary Vestigial Sideband Modulation), which is a type of single carrier modulation.

Upon comparison of the ATSC standard with a standard that employs the multi-carrier modulation method of which the Japanese ISDB-T (Integrated Services Digital Broadcasting-Terrestrial) standard is representative, it has been pointed out that the multipath tolerance of the former is inferior. In particular, its dynamic multipath tolerance, which is required for mobile reception, is extremely low. Due to this, since the start of commercial broadcasting in 1998, no ATSC receiver has existed that, in a practice, has acceptable performance for use in a moving vehicle.

However in recent years, due to the progression of digital demodulation technology, the possibilities for mobile reception of ATSC signals have increased. For example, in Patent Document #1, a receiver configuration is disclosed that is based upon diversity reception and channel estimation.

It is per se known that diversity reception enhances the multipath tolerance. In such diversity reception, the reception performance is improved by combining signals received by a plurality of antennas.

And, a receiver configuration based on channel estimation technique is replacing a prior receiver configuration based on an adaptive equalizer. With current ATSC receivers for fixed reception, a receiver configuration employing an adaptive equalizer has become widely used (refer to Non-Patent Document #1). However, with this prior art type of adaptive equalization technique, during mobile reception, it is difficult to track along a fast fading channel, and this situation is encountered quite often. In particular, the tracking speed gets lower in the case of a diversity receiver, with which it is also necessary to optimize the diversity combination coefficients, in addition to optimizing the equalization coefficients.

By contrast, with a receiver configuration that is based upon channel estimation, a channel impulse response (hereinafter "CIR") or a channel frequency response (hereinafter "CFR") is estimated for each diversity branch (hereinafter "branch"), and, by calculating the optimum diversity combination coefficients and equalization coefficients analytically on the basis of these estimations, it is possible to implement excellent tracking performance even for a fast fading channel.

PRIOR ART DOCUMENT

Patent Documents

Patent Document #1: U.S. Pat. No. 8,045,610

Non-Patent Documents

Non-Patent Document #1: DTV Signal Reception and Processing Considerations (ATSC document number T3-600r4)

SUMMARY OF THE INVENTION

Problem to be Solved by the Invention

However, no mention related to any technique for carrier synchronization is found in Patent Document #1 detailed above. Here, the carrier synchronization means detecting of modulation frequency errors generated by local oscillator imperfection within the receiver or the like, and processing to correct such errors.

With a conventional ATSC receiver for fixed reception, it is usual to perform carrier synchronization by applying PLL to the DC pilot component that is superimposed upon the transmitted wave. In other words, it is usual to control the frequency of a local oscillator used for frequency conversion so as to bring the phase of the pilot component accurately to zero.

However, it is not desirable to apply the carrier synchronization technique according to the prior art to mobile reception. Firstly, a case will be supposed in which, in a severe multipath environment, the amount of attenuation at the frequency corresponding to the pilot component (hereinafter the "pilot frequency") is extremely high. In this case, it is impossible to apply PLL to the pilot component because it is difficult for the receiver to detect the pilot component. Furthermore, with a frequency-time selective fading channel, which is quite often encountered by a mobile receiver, the transmission characteristic is greatly different for each frequency, and moreover fluctuates at high speed. With channel conditions of this type, fixing the phase of the pilot component, in other words the phase of the transmission characteristic at the pilot frequency, to zero is not desirable, because the transmission characteristic fluctuations at other frequencies become greatly increased (Doppler frequency shifting).

The present invention takes as its subject mobile reception of a single carrier digitally modulated wave, the possibility of which has become higher due to the recent progression of technology, and its object is to provide a carrier synchronization technique adapted thereto.

Means for Solving the Problems

When viewed from a first standpoint, the present invention is a diversity reception device that receives a signal that has been digitally modulated by single carrier modulation, comprising: a plurality of branch processing units to each of which one of a plurality of received signals is individually inputted; a combination and equalization unit calculating an equalized signal from said plurality of received signals; and a transmitted symbol estimation unit calculating an estimated transmitted symbol from said equalized signal; wherein each of said branch processing units comprises: a front end unit performing processes including modulation frequency conversion upon said received signal that has been inputted thereto, thus converting it to a baseband signal; a channel frequency characteristic estimation unit calculating an estimated channel frequency characteristic on the basis of said baseband signal and said estimated transmitted symbol; and a carrier frequency control unit controlling the conversion frequency for said modulation frequency conversion on the basis of said estimated channel frequency characteristic.

And, when viewed from a second standpoint, the present invention is a diversity reception method employed by a diversity reception device that receives a signal digitally modulated by single carrier modulation, said diversity reception method comprising the steps of: a branch processing of calculating a plurality of branch processing signals by performing processing upon each of a plurality of received signals; a combining and equalizing of calculating an equalized signal from said plurality of received signals; and a transmitted symbol estimating of calculating an estimated transmitted symbol from said equalized signal; wherein said branch processing step comprises: a signal band conversion step of performing processes that include modulation frequency conversion upon each of a plurality of received signals, thus converting it to a baseband signal; a channel frequency characteristic estimation step of calculating an estimated channel frequency characteristic on the basis of said baseband signal and said estimated transmitted symbol; and a carrier frequency control step of controlling the control frequency for said modulation frequency conversion on the basis of said estimated channel frequency characteristic.

Furthermore, when viewed from a third standpoint, the present invention is a non-transient computer readable medium having recorded thereon a reception program that, when executed, causes a computer in a diversity reception device, which receives a digitally modulated signal by single carrier modulation, to execute the diversity reception method according to the present invention.

REFERENCE SIGNS LIST

Figure 1:
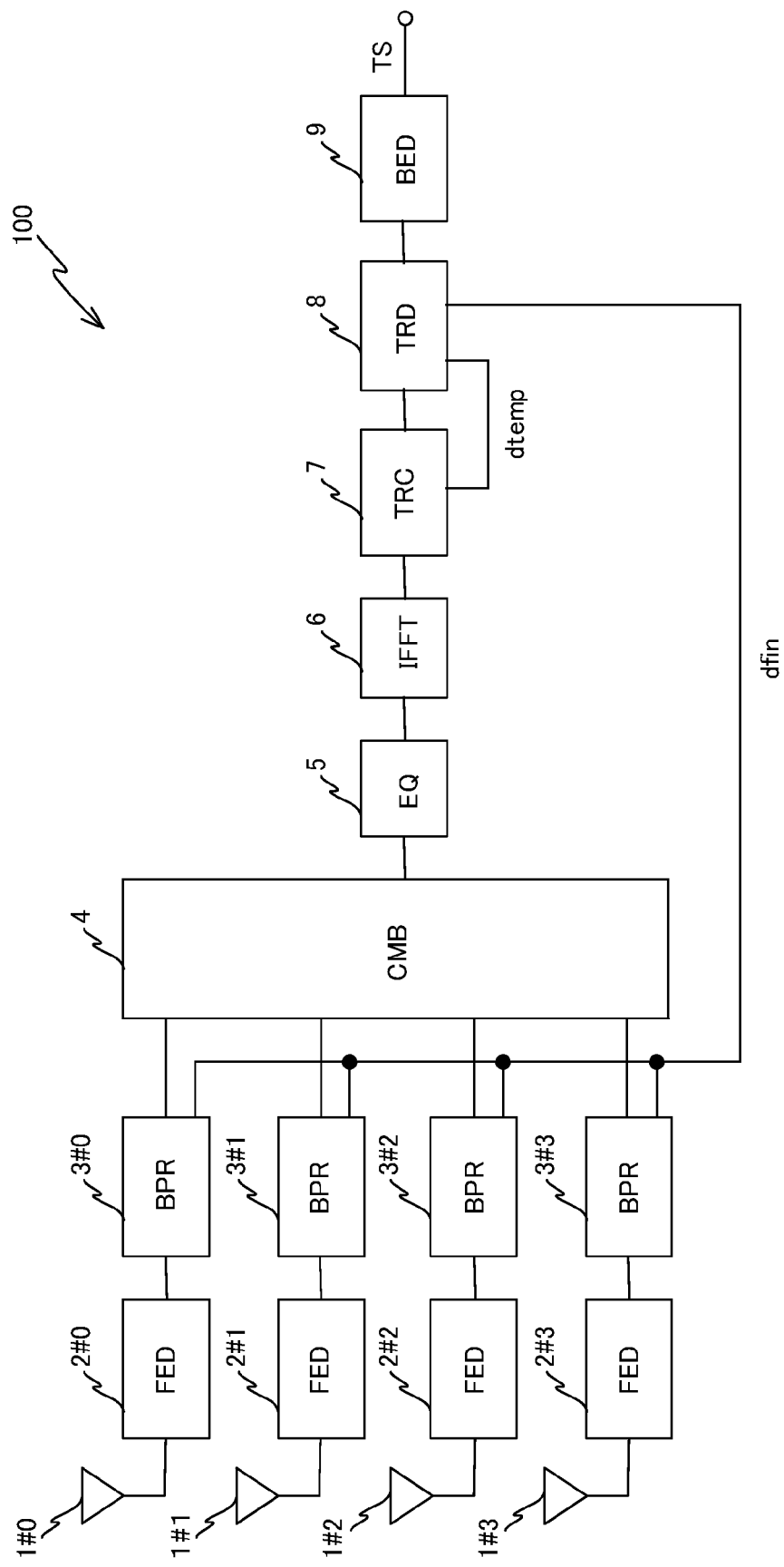
FIG. 1 is a block diagram of a receiver according to an embodiment.

100: receiver (diversity reception device)
2#0 to 2#3: front ends (front end units)
4: combination unit (a portion of the combination and equalization unit)
5: equalization unit (a portion of the combination and equalization unit)
6: IFFT unit (a portion of the combination and equalization unit)
7: compensation unit (a portion of the combination and equalization unit)
8: trellis decoder (transmitted symbol estimation unit)
12: RSS calculation unit (a portion of the combination and equalization unit)
13: CFR estimation unit (channel frequency characteristic estimation unit)
15: carrier frequency control unit
21: adaptive FIR filter (channel impulse response estimation unit)
22: coefficient transformation unit (channel characteristic transformation unit)

Embodiments for Carrying Out the Invention

In the subsequent description, the following mathematical symbols are employed:
$\pi$, pi: the circle circumference-diameter ratio
j: the imaginary unit
real(x): the real part of the complex number x
imag(x): the imaginary part of the complex number x
arg(x): the argument of the complex number x
exp(x): the complex exponential function
conj(x): the complex number that is conjugate to the complex number x
a←b: update a with b In the following digital sequences and vectors, the following indices will be used without any particular mention. However, these index symbols will be omitted as appropriate, provided that there is no risk of error.
s: segment index
b: branch index
k: time index
c: frequency index
q: tap index It will be supposed that an N-point FFT (Fast Fourier Transform) is given by the following Equation:

[Formula 1]

$$F(c) = \frac{1}{\sqrt{N}} \sum_{k=0}^{N-1} f(k) \exp(-2 \cdot \pi \cdot j \cdot c \cdot k / N) \quad (1)$$

Moreover, it will be supposed that an N-point IFFT (Inverse Fast Fourier Transform) is given by the following Equation:

[Formula 2]

$$f(k) = \frac{1}{\sqrt{N}} \sum_{c=0}^{N-1} F(c) \exp(2 \cdot \pi \cdot j \cdot c \cdot k / N) \quad (2)$$

Yet further, in the following description, an FFT without power normalization given by the following Equation will also be mentioned.

[Formula 3]

$$F(c) = \sum_{k=0}^{N-1} f(k) \exp(-2 \cdot \pi \cdot j \cdot c \cdot k / N) \quad (3)$$

In this case, this will be explicitly described as an FFT without power normalization, in order to distinguish it from a normal FFT of the type mentioned above.

In the following, an embodiment of the present invention will be explained with reference to the drawings. By way of example, a receiver for ATSC will be explained in the following. However it would also be possible to apply the present invention to a receiver for some other type of single carrier modulated signal, for example to a receiver for a signal that is modulated according to the SC mode of the Chinese DTMB standard.

Note that, in the following explanation, the reference symbol that is appended to each element in the drawings is specified when the element is first mentioned, but if the element is not appearing for the first time, then mention of the reference symbol is sometimes omitted as appears appropriate, provided that there is no risk of error. Moreover, although block diagrams are used in the description of the drawings for explaining the details of signal processing, these block diagrams do not necessarily specify the hardware configuration of the receiver. The concrete hardware configuration for implementing the details of such signal processing may be of any desired type, such as LSI, FPGA, DSP, CPU plus software, or the like.

Embodiment

In the following, the embodiment of the present invention will be explained.

Figure 2:
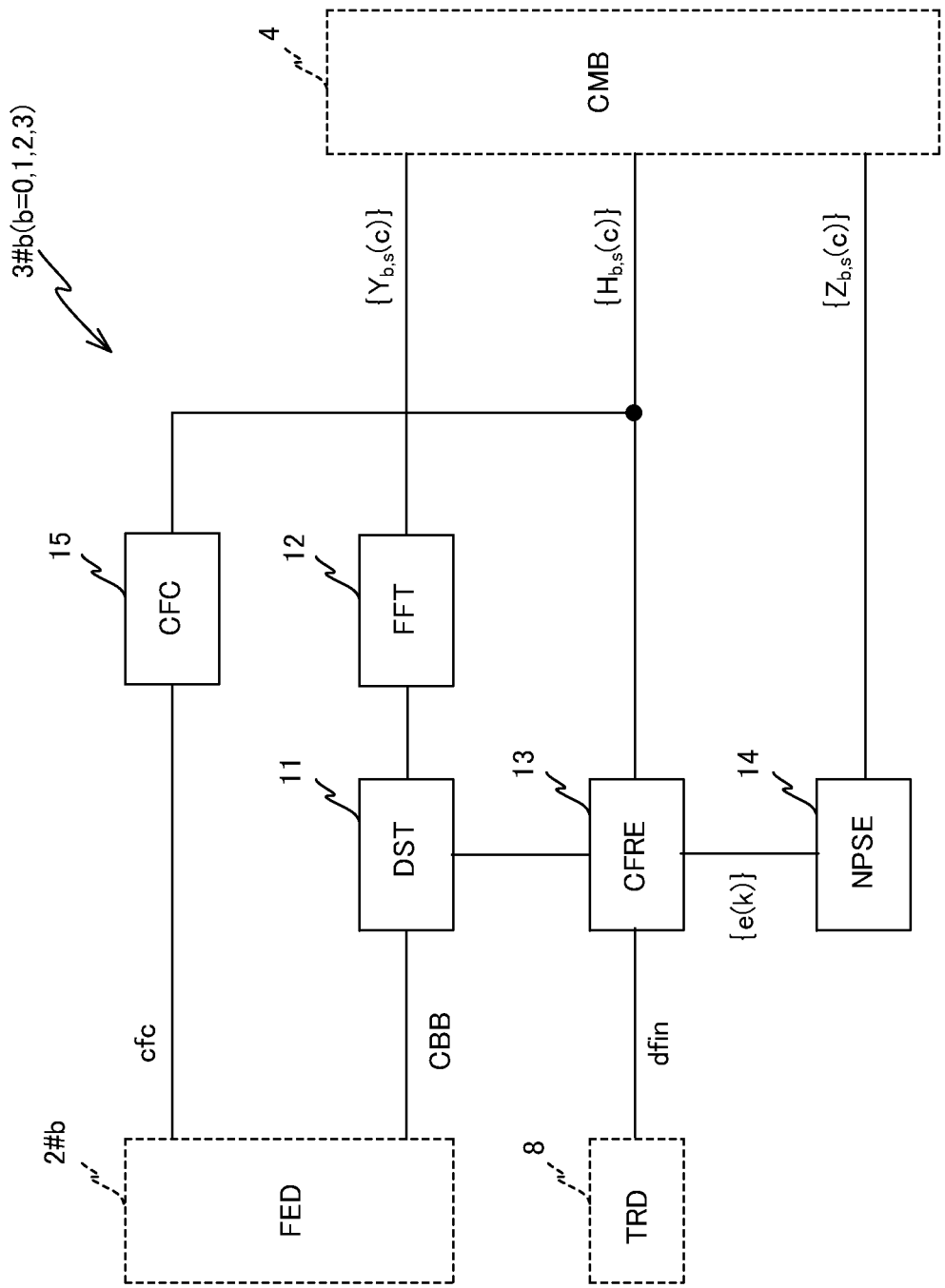
FIG. 2 is a block diagram of a branch processor (BPR) of FIG. 1.

Block diagrams are shown in FIGS. 1 and 2 for a receiver 100 according to the embodiment of the present invention for reception of ATSC signals. These block diagrams correspond to processing in the steady state. Generally, initial processing (acquisition) is performed before steady processing is performed. In this initial processing, establishment of frame synchronization and calculation of initial coefficients for an adaptive filter that will be described hereinafter are performed.

First, the overall configuration of the receiver will be explained with reference to FIG. 1. The receiver comprises four antennas 1#b (where b=0, 1, 2, 3; and the same hereinafter), four front ends (FEDs) 2#b corresponding respectively to these antennas, four branch processors (BPRs) 3#b respectively corresponding to the antennas in a similar manner, a combination unit (CMB) 4, an equalization unit (EQ) 5, an IFFT unit (IFFT) 6, a compensation unit (TRC) 7, a trellis decoder (TRD) 8, and a back end (BED) 9. Note that, while the number of branches in the embodiment is postulated as being four, a similar receiver configuration with a different number of branches would also be possible.

Figure 3:
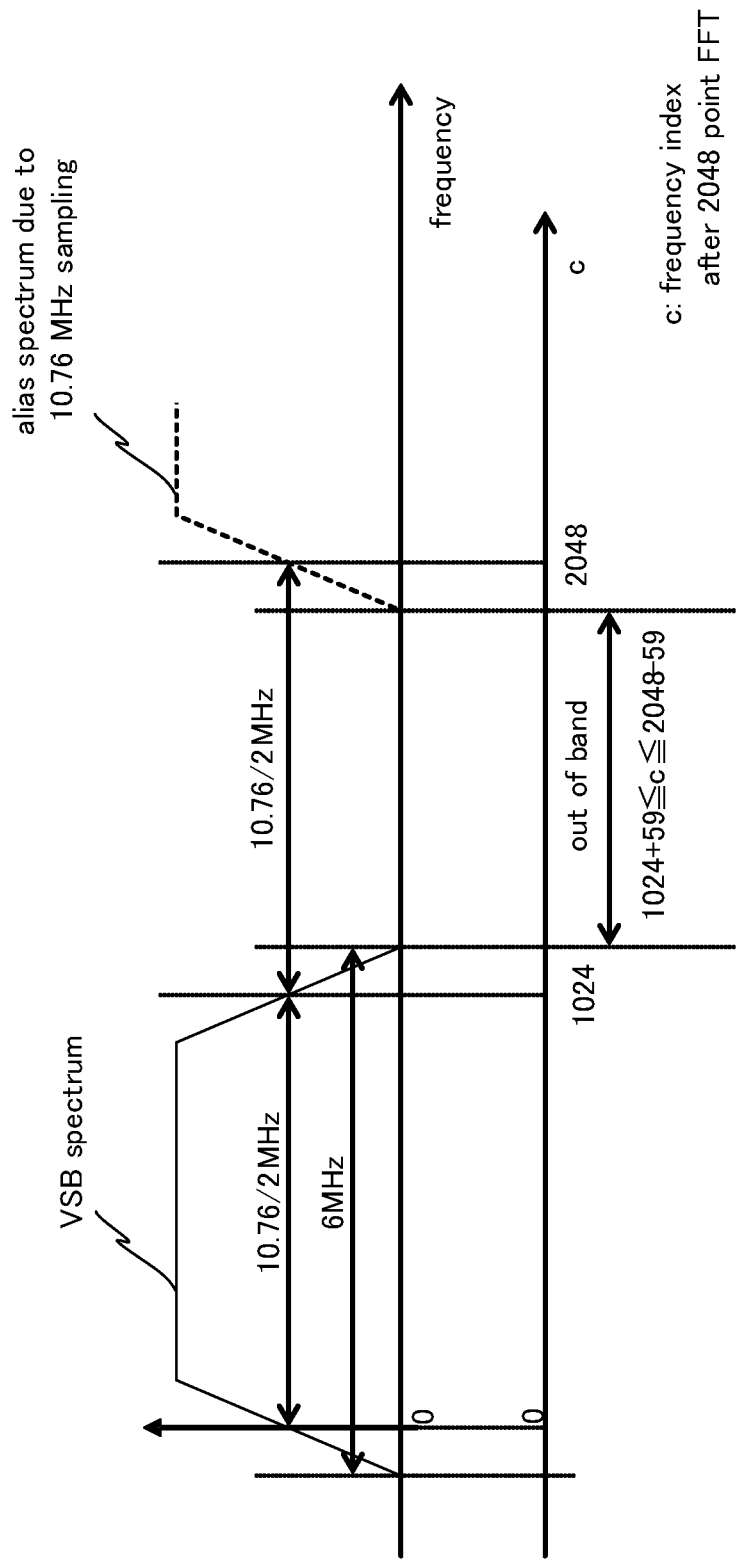
FIG. 3 is a figure for explanation of a VSB spectrum hypothesized in the embodiment.

Each of the front ends extracts a component of the desired channel from the time-continuous RF (Radio Frequency) signal that is inputted from the corresponding antenna, and converts this to a complex baseband signal (hereinafter this is termed a "CBB signal") which is a discrete time sequence, and outputs the CBB signal. Typically, the front end performs processing such as RF filtering, frequency conversion to IF (Intermediate Frequency), IF filtering, A/D conversion, frequency conversion to baseband, sampling frequency conversion, and so on. Here, it will be supposed that the sampling frequency of the CBB signal is synchronized to the symbol transmission rate (around 10.76 MHz). And, it will be supposed that, in the CBB signal, the VSB spectrum is located on the positive frequency side, as shown in FIG. 3.

Each of the front ends receives carrier frequency control from its corresponding branch processor. The modulation frequency of the CBB signal is controlled to zero by this carrier frequency control. More specifically, the carrier frequency control is achieved by controlling the oscillation frequency of a local oscillator that is used for frequency conversion from RF to IF. Alternatively, it would also be possible to control the oscillation frequency of a local oscillator that is used for frequency conversion from IF to baseband. The details of the carrier frequency control will be described hereinafter.

Each of the functional blocks of the embodiment performs block units processing (hereinafter termed "segment processing") in synchronization with "segment" prescribed by the ATSC standard. As a result of a single segment processing, an equalized signal having the length of a segment, in other words 832 symbols long, is outputted from the IFFT unit.

Each of the branch processors performs processing upon the CBB signal that is inputted thereto, and, in the processing of each segment, calculates the received signal spectrum (hereinafter termed the "RSS"), an estimate of the CFR (hereinafter termed the "estimated CFR"), and an estimation of the noise power spectrum (hereinafter termed the "estimated NPS"). The RSS and the estimated CFR are N-point complex vectors, while the estimated NPS is an N-point real number vector. Here, N is the number of points of the FFT, and is supposed to be 2048 in the embodiment. The vectors calculated in the processing of the s-th segment (where s=0, 1, 2 . . . ) by the b-th branch processor (3#b in FIG. 1) are expressed as follows. Note that the details of the branch processors will be described hereinafter.

$$\text{RSS: } \{Y_{b,s}(c): c=0,1,\ldots,N-1\} \quad (4)$$

$$\text{Estimated CFR: } \{H_{b,s}(c): c=0,1,\ldots,N-1\} \quad (5)$$

$$\text{Estimated NPS: } \{Z_{b,s}(c): c=0,1,\ldots,N-1\} \quad (6)$$

The combination unit combines the RSSs outputted from the branch processors on the basis of the estimated CFRs and the estimated NPSs. This combination is performed according to the maximal ratio combining manner for each frequency bin. More specifically, the combined spectrum $\{D_s(c)\}$ is calculated according to the following Equation:

[Formula 4]

$$D_s(c) = \sum_{b=0}^{3} \frac{conj(H_{b,s-1}(c))Y_{b,s}(c)}{Z_{b,s-1}(c)} \quad (7)$$

for $c = 0, 1, \ldots, N-1$

For the estimated CFR and the estimated NPS, the values calculated in the previous segment processing, i.e., the values calculated in the (s−1)th segment processing, are used. Moreover, it is assumed that the estimated CFR and the estimated NPS that are used for combination in the first segment processing (s=0) are calculated in advance on the initial processing.

The equalization unit performs equalization according to the MMSE (Minimum Mean Square Error) rule. First, the equalization unit calculates the frequency response $\{Q_s(c)\}$ after combination according to the following Equation:

[Formula 5]

$$Q_s(c) = \sum_{b=0}^{3} \frac{|H_{b,s-1}(c)|^2}{Z_{b,s-1}(c)} \text{ for } c = 0, 1, \Lambda, N-1 \quad (8)$$

Subsequently, the equalization unit calculates the equalized spectrum {V(c)} according to the following Equations. Here, $\sigma^2=21$ is the variance of the transmitted data symbols. Note that the symbols for the segment index are omitted.

[Formula 6]

$$J(c)=Q(c)+Q(-c)+1/\sigma^2 \text{ for } c=0 \quad (9)$$

[Formula 7]

$$J(c)=Q(c)+Q(N-c)+1/\sigma^2 \text{ for } c=1,2,\Lambda,N-1 \quad (10)$$

[Formula 8]

$$V(c)=D(c)/J(c) \text{ for } c=0,1,\Lambda,N-1 \quad (11)$$

From the 2048 point complex vector obtained by IFFT on the equalized spectrum, the IFFT unit outputs the 832 points in the central portion, which is obtained by excluding the leading 608 points and the trailing 608 points from the 2048 points, to the compensation unit as an equalized signal.

The compensation unit tracks the phase error, the DC offset, and the amplitude error included in the equalized signal provided from the IFFT unit, and compensates them.

For each symbol, compensation is performed according to the following Equations:

$$w=v \cdot \exp(2 \cdot pi \cdot j \cdot ph) \cdot g \quad (12)$$

$$r=2 \cdot \text{real}(w)+dc \quad (13)$$

Here, v is an input signal to the compensation unit, while r is the output signal of the compensation unit. Moreover, ph is a phase compensation value, g is a gain compensation value, and dc is a DC offset compensation value.

Each of the compensation values is updated so that r approaches the temporal decision value. Various types of methods can be employed as the updating method. For example, it would be acceptable to perform updating for each symbol according to the following Equations:

$$err=r-d\text{temp} \quad (14)$$

if $(|\text{imag}(w)|>1)$ then $perr=-err/\text{imag}(w)$, else $perr=0$ \quad (15)

if $(|d\text{temp}+dc|>3)$ then $gerr=err/(d\text{temp}+dc)$, else
$\quad gerr=0$ \quad (16)

$$g \leftarrow g-g\text{step}*gerr \quad (17)$$

$$ph \leftarrow ph-p\text{step}*perr \quad (18)$$

$$dc \leftarrow dc-d\text{step}*err \quad (19)$$

Here, dtemp is a temporal decision value, and gstep, pstep, and dstep are the updating steps for the compensation values.

Here, the temporal decision value provide estimated values of the transmitted symbol before the pilot is superposed, and are any one of the eight integer values {±1, ±3, ±5, ±7}. In the simplest manner, these temporal decision values can be calculated by a hard decision by using 8-value slicer. However, it is possible to obtain a less erroneous decision value by employing a Viterbi algorithm. In the embodiment, the temporal decision value for each symbol is provided from the trellis decoder that will be described below.

The trellis decoder performs Viterbi decoding upon the compensated signal outputted from the compensation unit. The decoded bit sequence that is obtained is provided to the back end. Moreover, the trellis decoder provides the final decision value (dfin) to the branch processor and provides the temporal decision value to the compensation unit.

The calculation of the temporal decision value will now be explained. For each of the symbols that is inputted, the trellis decoder of the embodiment is required to estimate the value of the transmitted symbol with very little delay, and is required to provide the estimate value to the compensation unit as the temporal decision value. In order to fulfill the requirement, the trellis decoder calculates the temporal decision value by accompanying with ACS (Add-Compare-Select) processing performed for each input signal.

ACS processing is a per se known technique that is widely used in Viterbi decoding. Generally, in ACS processing, a plurality of survivor paths are determined upon the trellis diagram on the basis of the input symbol. Among the plurality of survivor paths that have been determined by the ACS processing, the trellis decoder of the embodiment obtains the path whose likelihood is highest, in other words the newest encoder output corresponding to the survivor path whose likelihood is maximal, and takes this as the temporal decision value.

The calculation of the final decision value and of the decoded bit sequence will now be explained. A compensated signal of 832 symbols for each segment processing are inputted from the compensation unit to the trellis decoder of the embodiment. The trellis decoder performs the ACS processing described above upon each symbol in the compensated signal. And, at the time point that the sequence processing ends; the trellis decoder calculates a decoded bit sequence for the 832 symbols and the sequence of final decision values, all together. The decoded bit sequence is calculated as the trellis encoder input sequence corresponding to the maximum likelihood survivor path at the time point that the segment processing ends. On the other hand, the sequence of final decision values is calculated as the trellis encoder output sequence corresponding to the maximum likelihood survivor path. Note that the final decision value is a value that gives an estimation of the transmitted symbol after pilot superimposition, and its value is equal to one of the eight integer values {±1, ±3, ±5, ±7} with the pilot DC component 1.25 added thereto.

Note that symbols that are not trellis encoded (i.e. non-encoded symbols) are also inputted to the trellis decoder. For example, the first four symbols of each segment are the DSS (Data Segment Sync) prescribed by the ATSC standard, and the values thereof that have been transmitted are already known to be {5, −5, −5, 5}. Moreover, the first segment of the ATSC field includes a plurality of reserve bits. These reserve bits are not trellis encoded, and it is stipulated that the values thereof are only specified either 5 or −5. The trellis decoder of the embodiment does not perform Viterbi decoding if the input symbol corresponds to a non-encoded symbol of this type. And, if the input symbol corresponds to an already known, then the transmitted symbol value is used as its determined value. Furthermore, if the input symbol corresponds to a reserve bit, then the hard decision result obtained with a two-value slicer is used as its determined value.

The back end performs a series of decoding processes; concretely, it performs deinterleaving, Reed-Solomon decoding, and derandomization, processing of various types, and outputs an MPEG transport stream (MPEG-TS) obtained as a result. The MPEG-TS is converted to video and audio by appropriate decoding processing.

The branch processors will now be explained. A block diagram of the interior of one branch processor is shown in FIG. 2. Each of the branch processors comprises a data distribution unit (DST) 11, an RSS calculation unit (FFT) 12, a CFR estimation unit (CFRE) 13, an NPS estimation unit (NSPE) 14, and a carrier frequency control unit (CFC) 15.

In each segment processing, the data distribution unit extracts sectional signals from the CBB signal and provides them to the RSS calculation unit and to the CFR estimation unit. The sectional signal of 832 points that has been extracted so that there are no gaps or overlapping on the CBB signal is provided to the CFR estimation unit. In other words, if the CBB signal is taken to be {cbb(k)}, then the sectional signal that is provided to the CFR estimation unit in the s-th segment processing is {cbb(k): ko+832s≤k<ko+832s+831}. Here, the value of ko is determined by the initial processing. On the other hand, a sectional signal of 2048 points (the number of points N in the FFT) is provided to the RSS calculation unit, with overlap interval of 608 points each being added before and after the interval provided to the CFR estimation unit.

The RSS calculation unit calculates the RSS by performing a FFT upon the 2048 point section signal provided from the data distribution unit for each segment processing.

The CFR estimation unit estimates the CFR for each branch on the basis of the CBB signal provided from the data distribution unit and the final decision values provided from the trellis decoder, and provides the results to the combination unit and to the carrier frequency control unit. Moreover, it provides the residual signal obtained together with the estimation is provided to the NPS estimation unit.

Figure 4:
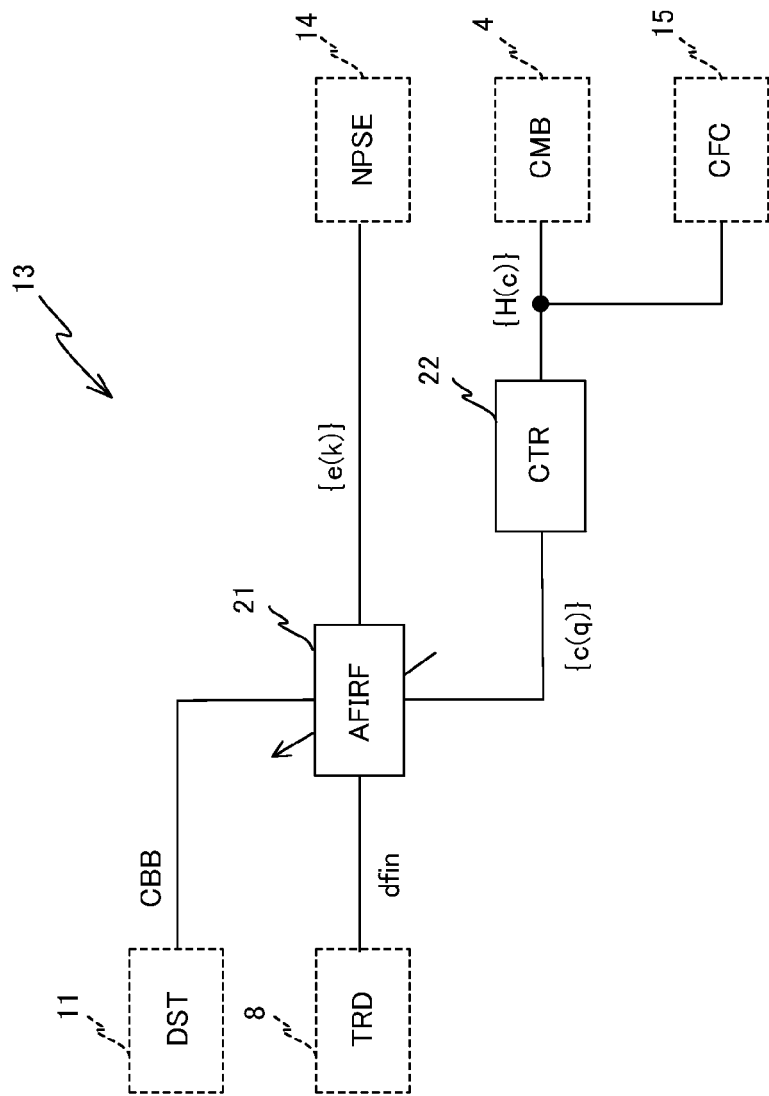
FIG. 4 is a block diagram of a CFR estimation unit (CFRE) of the embodiment.

The configuration of the CFR estimation unit of the embodiment is shown in FIG. 4. The CFR estimation unit of the embodiment comprises an adaptive FIR filter (AFIRF) 21 and a coefficient transform unit (CTR) 22.

Figure 5:
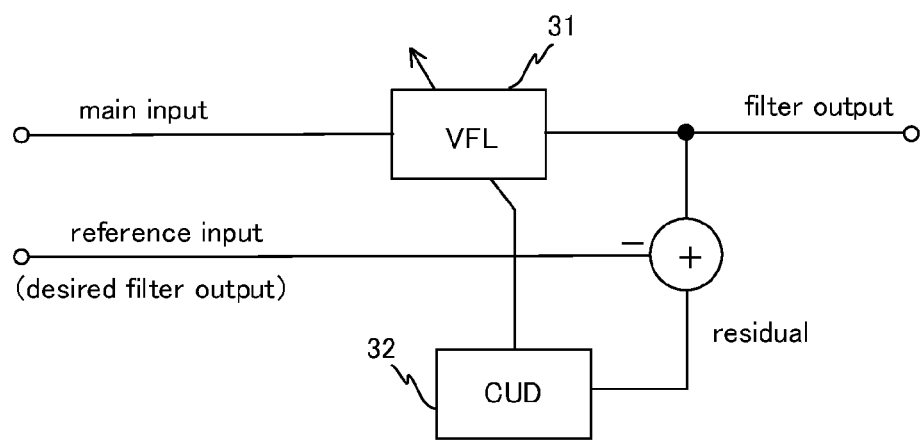
FIG. 5 is a block diagram of a normal adaptive filter.

Now, this per se known adaptive filter will be explained. A typical configuration for an adaptive filter is shown in FIG. 5. As shown in the figure, the adaptive filter comprises a variable coefficient filter (VFL) 31 and a coefficient updating unit (CUD) 32. Generally, an adaptive filter requires two input signals. One of these is the main input signal that is inputted to a variable coefficient filter, while the other is a reference input signal that gives the desired filter output. The coefficient updating unit updates the filter coefficients so that the filter output signal becomes closer to the desired filter output signal. In more detail, on the basis of a residual signal which is the difference between the actual filter output signal and the reference input signal, the coefficient updating unit updates the filter coefficients so that the power of this residual signal becomes low.

The final decision values provided from the trellis decoder are sent to the adaptive FIR filter of the embodiment as the main input signal. Moreover, the CBB signal provided from the data distribution unit is sent as the reference input signal. As previously described, the adaptive FIR filter updates the coefficient vector of the FIR filter adaptively so that the FIR filter output becomes the reference input signal. As a result, the coefficient vector provides an estimated value of the CIR.

A per se known LMS (Least Mean Squares) algorithm is used for the coefficient updating. Note that it would also be possible to apply some other algorithm, for example an RLS (Recursive Least Squares) algorithm or the like.

The details of the processing performed by the adaptive FIR filter of the embodiment will now be explained in the following. It will be supposed that, in the processing of some segment, the CBB signal provided from the data distribution unit is {y(k): k=0, 1, ..., 831} and the sequence of the final decision values provided from the trellis decoder is {d(k): k=0, 1, ..., 831}. And it will be supposed that, in the embodiment, the tap length of the adaptive FIR filter is 512, the coefficient vector is {c(q): q=0, 1, ..., 511}, and the tap vector is {x(q): q=0, 1, ..., 511}. At this time, the processing of the adaptive FIR filter for each symbol is given by the following Equations:

$$\{x(0), x(1) \ldots x(511)\} \leftarrow \{d(k), x(0) \ldots x(510)\} \quad (20)$$

$$r(k) = c(0)x(0) + c(1)x(1) + + c(511)x(511) \quad (21)$$

$$e(k) = r(k) - y(k) \quad (22)$$

$$c(q) \leftarrow c(q) - \mu e(k)x(q) \text{ for } q=0,1 \ldots 511 \quad (23)$$

Equation (20) shows the shift processing for the tap vector. By using Equation (21), the output r(k) of the adaptive FIR filter is calculated as being the sum of products of the coefficient vector and of the tap vector. By using Equation (22), the residual signal e(k) is calculated as being the difference between this r(k) and the actually received CBB signal. And in Equation (23), the coefficient vector is updated according to the LMS algorithm. Due to this updating, the power of the residual signal is minimized. Note that μ is the updating step. With the adaptive FIR filter of this example, the processing described above is performed 832 times in the processing of each segment, in other words for k=0, 1, ..., 831. The residual signal {e(k): k=0, 1, ..., 831} is provided to the NPS estimation unit.

It will be supposed that the initial value of the coefficient vector is calculated by the initial processing. The initial value may be calculated by any one of various methods; for example, it could be calculated on the basis of correlation between the CBB signal and the PN511 sequence prescribed by the ATSC standard.

The coefficient transformation unit calculates the estimated CFR on the basis of the coefficient vector {c(q): q=0, 1, ..., 51} at the time point that the adaptive FIR filter has completed the segment processing described above.

In concrete terms, the coefficient transformation unit calculates the estimated CFR according to the following Equations:

$$\{c'(q): c=0,1 \ldots 2047\} = \{c(0), c(1), c(511), 0, 0, 0, \ldots\} \quad (23a)$$

$$\{c=0,1,\ldots,2047\} = \text{FFT}(\{c'(q)\}) \quad (23b)$$

$$\text{if } (1024+59 \leq c \leq 2048-59): H(c) = 0, \text{ else: } H(c) = H'(c) \quad (23c)$$

According to Equation (23a), the coefficient vector is extended to an N-point vector by zero padding. Then, by using Equation (23b), the frequency response {H'(c)} of the adaptive FIR filter is calculated by performing an N-point FFT (without power normalization) upon the extended coefficient vector. Moreover, by using Equation (23c), the estimated CFR {H(c)} provided to the combination unit is calculated by forcibly setting terms in {H'(c)} that correspond to outside the 6 MHz channel band to zero. This estimated CFR calculated is used by the combination unit in the next segment processing.

The NPS estimation unit estimates the NPS on the basis of the residual signal provided from an adaptive FIR filter.

Figure 6:
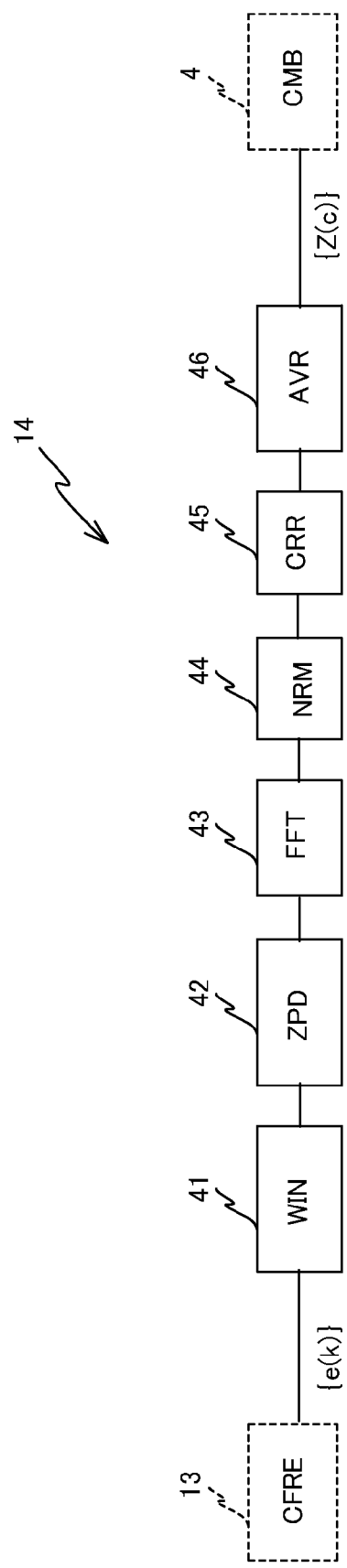
FIG. 6 is a block diagram of an NPS estimation unit (NPSE) in FIG. 2.

As shown in FIG. 6, the NPS estimation unit comprises a windowing unit (WIN) 41, a zero padding unit (ZPD) 42, a Fourier transformation unit (FFT) 43, a norm calculation unit (NRM) 44, a power correction unit (CRR) 45, and an averaging unit (AVR) 46.

The windowing unit performs a windowing upon the residual signal of the 832 symbols {e(k): 0, 1, ... , 831} provided from the adaptive FIR filter for the processing of each segment. A raised cosine window, a Hamming window, a Blackman window or the like may be employed as the windowing function. For example, if a raised cosine window is employed, then the windowing may be performed according to the following Equation:

$$e'(k) = \text{wind}(k) \cdot e(k) \text{ for } k=0,1,\ldots,831 \quad (24)$$

Here, e'(k) is the signal after windowing, and wind(k) is the raised cosine window function given by the following Equation:

[Formula 9]

$$\text{wind}(k) = \sqrt{\frac{8}{3} \frac{1 - \cos(2\pi k / 832)}{2}} \quad (25)$$

The zero padding unit performs zero padding upon the back end of the signal after windowing, and extending it to N (2048) points.

The Fourier transformation unit performs an N-point FFT upon the output of the zero padding unit.

The norm calculation unit calculates a norm value for each of the N-point complex numbers calculated by the FFT.

The power correction unit corrects the power, which has been reduced by the zero padding, by multiplying the norm values by (2048/832).

The averaging unit calculates the estimated NPS by averaging the corrected norm values. This averaging may, for example, be implemented with a first order IIR filter. In this case, taking the norm values after power amendment as being {Gs(c): c=0, 1, ... , N−1}, the estimated NPS {Zs(c): c=0, 1, ... , N−1} is calculated according to the following Equation:

$$Z_S(c) = Z_{S-1}(c) + \gamma(G_S(c) - Z_{S-1}(c)) \quad (26)$$

Here, γ is the IIR filter coefficient. The fact should be noted that the estimated NPS calculated here is used by the combination unit in the next segment processing.

Next, the carrier frequency control unit will be explained. The carrier frequency control unit performs carrier frequency control upon the corresponding front end, on the basis of the estimated CFR provided from the CFR estimation unit 13.

Figure 7:
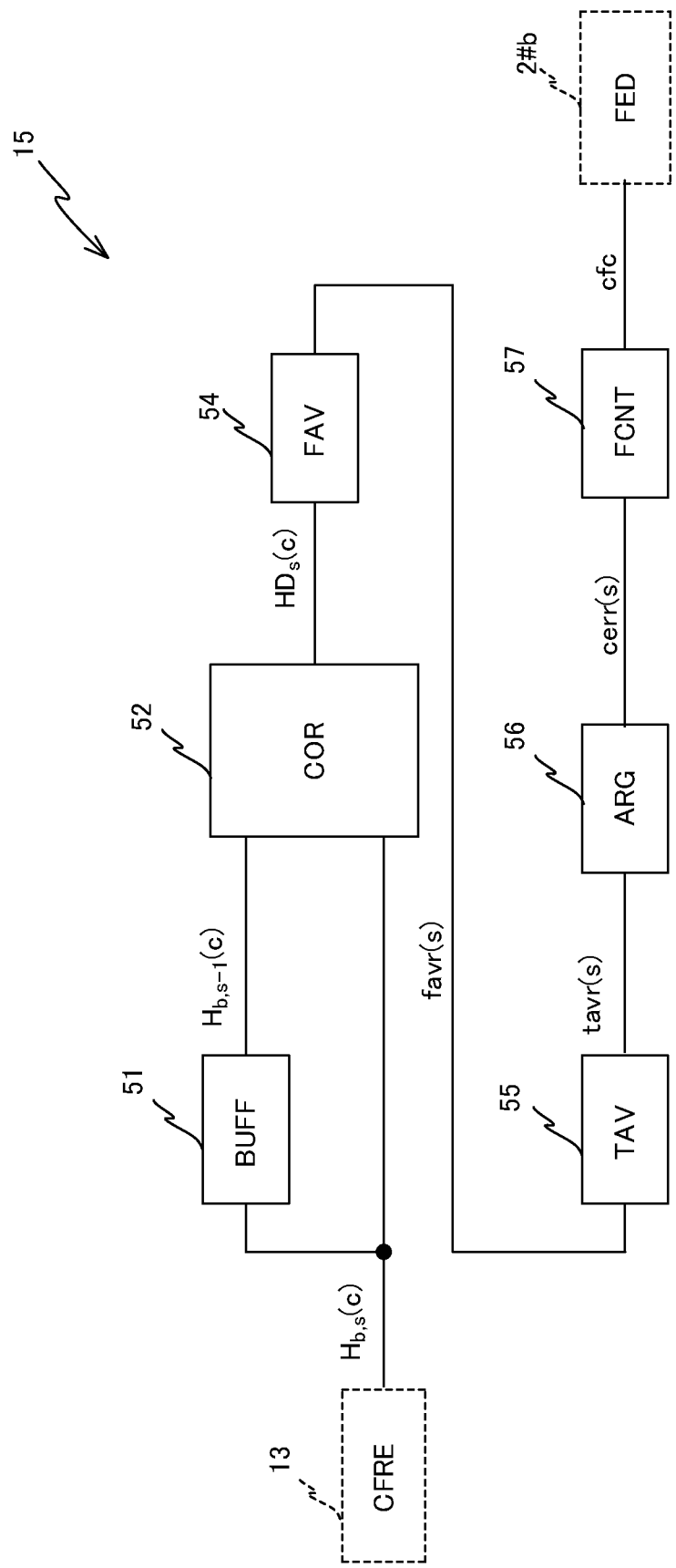
FIG. 7 is a block diagram of a carrier frequency control unit (CFC) in FIG. 2.

As shown in FIG. 7, the carrier frequency control unit comprises a buffer unit 51, a correlation calculation unit 52, a frequency direction averaging unit 54, a time direction averaging unit 55, an argument extraction unit 56, and a frequency conversion unit 57.

The buffer unit temporarily stores the estimated CFR.

For each frequency, the correlation calculation unit calculates the correlation HDS(c) between the estimated CFR for the previous segment as read out from the buffer unit and the estimated CFR for the present segment, according to the following Equation:

$$HD_S(c) = H_S(c) \cdot \text{conj}(H_{S-1}(c)) \quad (27)$$

Here, $HD_S(c)$ represents the amount of the change of the transmission characteristic at the subject frequency between one segment and the next.

The frequency direction averaging unit calculates the frequency direction average favr(s) of HDS(c) according to the following Equation:

$$favr(s) = \sum_{c=0}^{N/2-1} HD_s(c) \quad (28)$$

The time direction averaging unit calculates the time direction average of favr(s). When a first order IIR filter is used for this averaging, the time direction average tavr(s) is calculated according to the following Equation;

$$tavr(s) = tavr(s-1) + ciir \cdot (favr(s) - tavr(s-1)) \quad (29)$$

Here, ciir is the coefficient of the IIR filter. Note that the time direction averaging unit is not absolutely necessary.

The argument calculation unit calculates the argument cerr(s) of the time direction average tavr(s), i.e. arg(tavr(s)). Here, the argument cerr(s) shows how much the phase of the channel has rotated between one segment and the next, and represents the modulation frequency of the CBB signal.

The front end control unit performs feedback control of the conversion frequency in the front end unit on the basis of the argument cerr(s). The feedback control is performed so that cerr(s) approaches zero, in other words so that the modulation frequency of the CBB signal approaches zero.

As described above, the carrier frequency control unit of the example performs control of the carrier frequency on the basis of change of the transmission characteristic, as averaged over the entire area of the VSB spectrum. Due to this, it is possible to perform stabilized carrier frequency control, even if the pilot component is attenuated due to multipath phenomenon. Moreover, this does not invite increase of transmission characteristic fluctuations except for the pilot frequency.

Note that the correspondence between structural elements in the Claims and structural elements in the embodiment is as follows:

"diversity reception device": the receiver 100;

"front end unit": the front end 2#b;

"combination and equalization unit": the RSS calculation unit 12, the combination unit 4, equalization unit 5, the IFFT unit 6, and the compensation unit 7;

"transmitted symbol estimation unit": the trellis decoder 8;

"channel frequency characteristic estimation unit": the CFR estimation unit 13;

"channel impulse response estimation unit": the adaptive FIR filter 21;

"channel characteristic transformation unit": the coefficient transformation unit 22;

"carrier frequency control unit": the carrier frequency control unit 15.

The invention claimed is:

1. A diversity reception device that receives a signal that has been digitally modulated by single carrier modulation, comprising:

a plurality of branch processing units to each of which one of a plurality of received signals is individually inputted;

a combination and equalization unit calculating an equalized signal from said plurality of received signals; and a transmitted symbol estimation unit calculating an estimated transmitted symbol from said equalized signal; wherein each of said branch processing units comprises:

a front end unit performing processes including modulation frequency conversion upon said received signal that has been inputted thereto, thus converting it to a baseband signal;

a channel frequency characteristic estimation unit calculating an estimated channel frequency characteristic on the basis of said baseband signal and said estimated transmitted symbol; and a carrier frequency control unit controlling the conversion frequency for said modulation frequency conversion on the basis of said estimated channel frequency characteristic.

2. The diversity reception device according to claim 1, wherein said channel frequency characteristic estimation unit comprises:

a channel impulse response estimation unit calculating an estimated channel impulse response on the basis of said baseband signal and said estimated transmitted symbol; and a channel characteristic transformation unit transforming said estimated channel impulse response to said channel frequency characteristic.

3. The diversity reception device according to claim 1, wherein:

said channel frequency characteristic estimation unit calculates a plurality of estimated channel frequency characteristics, each corresponding to a different time period; and said carrier frequency control unit controls said conversion frequency on the basis of at least two or more estimated channel responses among said plurality of estimated channel frequency characteristics.

4. The diversity reception device according to claim 3, wherein said carrier frequency control unit controls said conversion frequency on the basis of complex conjugate correlations between two estimated channel frequency characteristics among said plurality of estimated channel frequency characteristics.

5. The diversity reception device according to claim 4, wherein said two estimated channel frequency characteristics being sequential in time.

6. The diversity reception device according to claim 4, wherein said carrier frequency control unit controls said conversion frequency on the basis of a frequency direction average of a plurality of said complex conjugate correlations.

7. The diversity reception device according to claim 6, wherein said carrier frequency control unit controls said conversion frequency on the basis of an argument of said frequency direction average.

8. The diversity reception device according to claim 6, wherein said carrier frequency control unit controls said conversion frequency on the basis of an argument of a time direction average of a plurality of said frequency direction average.

9. A diversity reception method employed by a diversity reception device that receives a signal digitally modulated by single carrier modulation, said diversity reception method comprising the steps of:

a branch processing of calculating a plurality of branch processing signals by performing processing upon each of a plurality of received signals;

a combining and equalizing of calculating an equalized signal from said plurality of received signals; and a transmitted symbol estimating of calculating an estimated transmitted symbol from said equalized signal; wherein said branch processing step comprises:

a signal band conversion step of performing processes that include modulation frequency conversion upon each of a plurality of received signals, thus converting it to a baseband signal;

a channel frequency characteristic estimation step of calculating an estimated channel frequency characteristic on the basis of said baseband signal and said estimated transmitted symbol; and a carrier frequency control step of controlling the control frequency for said modulation frequency conversion on the basis of said estimated channel frequency characteristic.

10. A non-transient computer readable medium having recorded thereon a reception program that, when executed, causes a computer in a diversity reception device, which receives a digitally modulated signal by single carrier modulation, to execute the diversity reception method according to claim 9.

* * * * *